Oct. 5, 1926.
G. HIDOUX
1,602,154
APPARATUS FOR INSURING INTIMATE ADMIXTURE OF PULVERULENT OR
GRANULAR MATTER AND A LIQUID PRODUCT
Filed Dec. 4, 1924     3 Sheets-Sheet 1
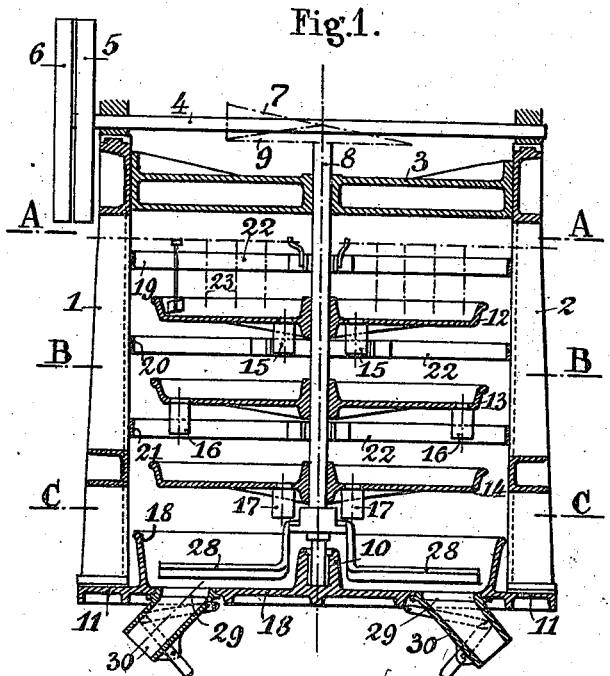
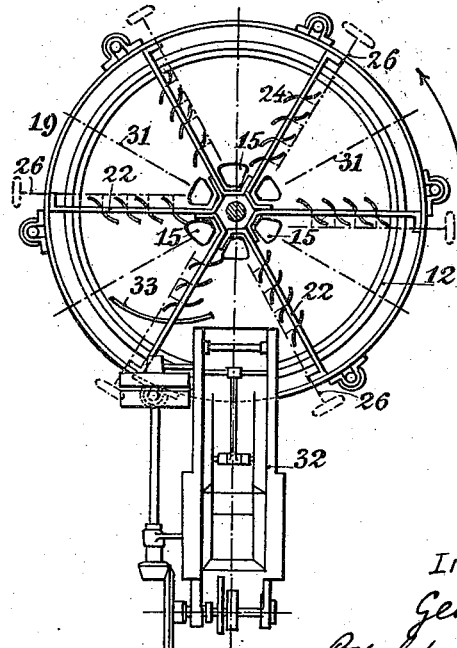
INVENTOR:
Georges Hidoux
By Chatwin & Company
Attys Oct. 5, 1926. 1,602,154
G. HIDOUX
APPARATUS FOR INSURING INTIMATE ADMIXTURE OF PULVERULENT OR
GRANULAR MATTER AND A LIQUID PRODUCT
Filed Dec. 4, 1924 3 Sheets-Sheet 3
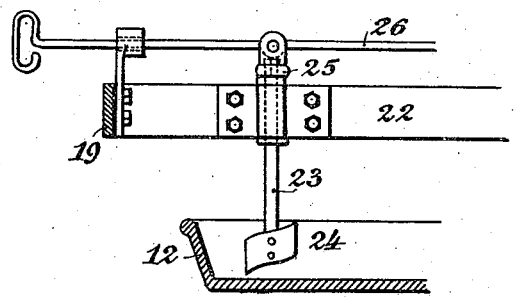
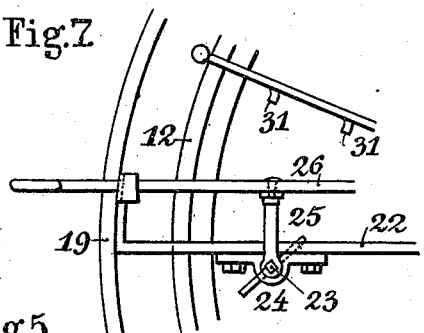
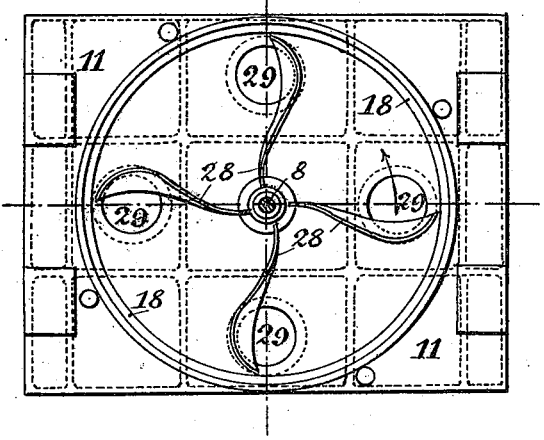
INVENTOR:-
Georges Hidoux
By Chatwin Kompany
attys Patented Oct. 5, 1926.

1,602,154

UNITED STATES PATENT OFFICE.

GEORGES HIDOUX, OF ST.-DENIS, FRANCE, ASSIGNOR TO SOCIÉTÉ D'EXPLOITATION DES PROCÉDÉS HIDOUX, OF ST.-DENIS, FRANCE, A FRENCH COMPANY.

APPARATUS FOR INSURING INTIMATE ADMIXTURE OF PULVERULENT OR GRANULAR MATTER AND A LIQUID PRODUCT.

Application filed December 4, 1924, Serial No. 754,004, and in Belgium December 12, 1923.

This invention relates to apparatus for effecting the admixture of certain substances with water or other fluid, and more particularly to apparatus of the type comprising a series of superimposed plates or pans to successively receive material and fluid to be admixed by stirrers set at an angle to direct the mixed or diluted substances to outlets in the trays.

Actual use and experiment has demonstrated that apparatus in which plastic, sticky or gummy or greasy materials such as clay, which absorb water very slowly, are stirred on the successive plates or pans, by rotating stirring blades, are unsuitable for the purpose for the reason that in the upper pans especially, the solid or heavy inert material on the fixed base is compressed by the blades into such a hard mass that it eventually clogs and arrests rotation of the blades and operation of the apparatus besides clogging the discharge openings.

Actual use and experiment have, however, demonstrated that the objections above referred to can be obviated by rotating the pans against fixed blades, thus making use of the inertia, and setting of fixed blades at an angle, alternately near the centre of one pan and near the periphery of the next pan to direct the material to the discharge opening at those parts; the blades being mounted in such manner that the furrows, formed by one row of blades, are covered over by the next row of blades, and, further, providing inclines furnished with nozzles, disposed above each of the plates, or pans and operating in conjunction with compressed air to ensure projection of liquid in very fine particles onto the surfaces of the material as it is exposed by a blade and subsequently covered by another blade; the small correct quantity of water being thereby thoroughly absorbed. It has been found that unless such precautions are stringently observed that the outer surfaces of grains of clay or similar substances are too wet, whilst their interiors are too dry.

A constructional form of the invention is shown by way of example in the accompanying drawing, in which:—

Figure 2:
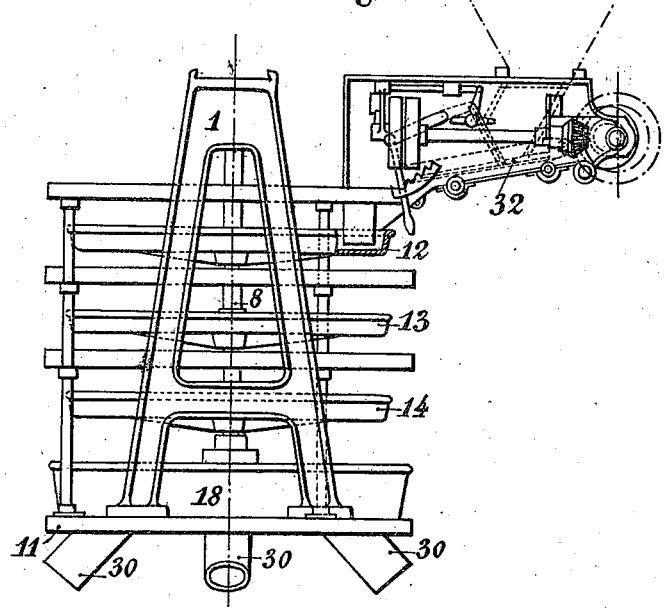
Figure 4:
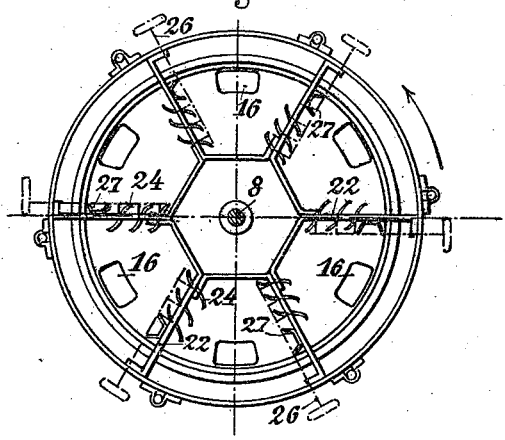

Figure 1 shows diagrammatically the whole of the apparatus in vertical longitudinal section; Fig. 2 is a corresponding side view; Figs. 3, 4 and 5 show the same apparatus in horizontal section taken respectively on AA, BB and CC of Fig. 1; Figs. 6, 7 show, to larger scale, the detail of the mounting of blades which have adjustable inclination, of fixed plates and the arrangement for the supply of liquid and compressed air.

As seen in the drawing the apparatus comprises a structure formed by two vertical supports 1 and 2 joined by a cross-piece 3. At the upper part of these members are secured bearings for supporting a horizontal shaft 4, carrying the fast and loose driving pulleys, 5 and 6, and a conical pinion 7 for transmitting the rotatory movement of the horizontal shaft 4 to a vertical shaft 8 on which is keyed a second conical pinion 9 gearing with the pinion 7. The ratio of these two pinions is preferably such as to reduce speed of rotation of the vertical shaft 8 in respect to that of the horizontal shaft 4.

The vertical arm 8 turns at its lower end in a socket 10 integral with a base 11 on which the two supports of the structure rest.

On the vertical arm 8 are keyed the circular plates 12, 13 and 14, forming vessels to contain the material to be treated, the latter being let in on the highest plate 12 and passing successively on the intermediate plate 13 then on the lower plate 14. For this purpose the top plate 12 shows on the bottom holes made near its centre and communicating with channels 15 which lead into the intermediate plate 13. The latter also has holes on the periphery of its base and provided with channels 16 which lead into the lower plate 14. This last one is similar to the top plate, its holes being formed at the centre and the channels 17 which communicate with these holes lead into a vat 18 integral with the base 11 and whose diameter is slightly larger than that of the plates.

Circular rings 19, 20 and 21 of iron plate are secured on the two supports of the structure above each of the plates 12, 13 and 14.

These rings form the supports for radial arms 22, similarly of iron plate, distributed in suitable numbers around the internal periphery of the fixed rings 19, 20, 21, and disposed so as to form at their central point of junction a sleeve in which the vertical shaft 8 freely passes. The arms 22 are provided with collars in which are engaged the rods 23 carrying at their lower end the blades 24 shaped for preference like a ploughshare and engaging in each of the rotatable plates. These blades are mounted staggered on the arms 22 so as to scoop furrows alternately open and closed in the material so as to present new surfaces for the projection of the liquid. On the other hand the blades may be secured or receive a variable and adjustable inclination according to the delivery so as to prevent the material overflowing the plates. For this purpose the rods 23, on which are mounted the blades, are connected at their top end to cranks 25 (Figs. 6 and 7) articulated on a bar 26 which is mounted and may slide in collars fixed on the rings 19, 20 and 21 and on the fixed sleeves formed by the arms. Each of the bars 26 is disposed parallel to the blade-carrying arms 22 and the end passing out of the structure forms an operating handle.

The blades of the intermediate plate 13 mounted in the radius of the peripheral holes are in the shape of cups 27 whose outer edge is tangential to the wall of the plate and retains the material brought to the centre by the other blades 24 until the holes are brought opposite the cups the material then passing normally through these holes and into the channels 16 to fall on to the lower plate 14.

At the lower part of the vertical shaft 8 is keyed a hub on which are secured blades 28 which dip into the vessel 18 and rotate with the shaft 8. These blades are conveniently curved inwards following the sense of rotation and bent so as to stir up the material, to convey and distribute it regularly at four holes 29 formed in the base 11 forming the bottom of the vessel 18. Each of the holes 29 communicates with an evacuation channel 30 provided with an adjustable trap-door opening, operated from outside and permitting the distribution of the delivery at will, to feed the different apparatus which require different outputs or finally to put the treated material directly into bags.

The projection of the liquid is assured by compressed air nozzles 31 disposed between each of the blade-carrying arms, and the supply of the liquid is maintained by means of a reservoir under a greater pressure than the air. A regulating member in checking more or less the delivery of the liquid, permits of putting the latter in the position of normal equilibrium in relation to the manometrical pressure supplied by the compressed air generator. In the present method of regulation, the air pressure may vary between 300 and 800 mm. of water column.

Finally, the material to be treated is brought onto the top plate 12 by a vibrating distributor 32 giving three adjustments for the delivery. A delivery blade 33 is secured in any convenient way on the top ring 19 and it is formed so as to prevent the material in treatment on the top plate 12 returning relative to the distributor outlet during the rotatory movement of the said plate.

The granular or pulverulent materials introduced by the vibrating distributor 32 on the top plate 12 thus undergo rotatory movement of the latter and are subjected to the action of the blades 24 which trace, as above said, furrows alternatively open and closed, so as to present new surfaces to the projection of the liquid. The blades are set so as to conduct the material towards the holes made at the centre of the plate, so that the treated materials on the first plate 12 arrive on the intermediate plate 13 whose blades are set so as to conduct the materials towards the periphery.

When the materials have passed successively on the three superimposed rotatable plates, in which they have been subjected to the action of the fixed blades and the projection of the liquid, which thus uniformly impregnates them, they arrive in the fixed vessel 18 by way of the channels 17. They are thus conveyed by the inward-curved blades 28 keyed on the vertical shaft which distributes them regularly to the four evacuation channels 30 to prevent their heaping up and compression.

It is understood that the arrangement shown is given only by way of example and that the constructional forms, details of construction, accessories and dimensions may vary according to the circumstances, without changing the principle of the invention. The number of rotatable plates especially might vary as well as the number of holes provided with channels. Nevertheless, in order that the fall from one plate to another is regularly effected through the periphery it is preferable to employ as many channels as there are rows of blades.

I claim:—

1. Apparatus of the type referred to, comprising superimposed rotatably mounted pans for the material to be treated and having discharge openings therein disposed alternately near the centre and near the periphery in adjacent pans, stationary radially disposed sets of blades depended within the pans and inclined towards their discharge openings, the blades in adjacent sets being relatively staggered in a radial direction, and a liquid supply nozzle disposed immediately in rear of each blade and directed towards the part of the pan where the material is displaced by the appurtenant blade.

2. Apparatus of the type referred to, comprising superimposed rotatably mounted pans for the material to be treated and having discharge openings therein disposed alternately near the centre and near the periphery in adjacent pans, stationary radially disposed sets of blades depended within the pans and inclined towards their discharge openings, the blades in adjacent sets being relatively staggered in a radial direction, means for varying the inclination of said blades, and a liquid supply nozzle disposed immediately in rear of each blade and directed towards the part of the pan where the material is displaced by the appurtenant blade.

GEORGES HIDOUX.